(12) United States Patent
Ezumi et al.

(10) Patent No.: US 6,779,705 B2
(45) Date of Patent: Aug. 24, 2004

(54) FRICTION STIR WELDING METHOD

(75) Inventors: Masakuni Ezumi, Yamaguchi (JP);
Kazushige Fukuyori, Yamaguchi (JP);
Tetsuya Matsunaga, Yamaguchi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/058,957

(22) Filed: Jan. 30, 2002

(65) Prior Publication Data

US 2003/0038159 A1 Feb. 27, 2003

(30) Foreign Application Priority Data

Aug. 24, 2001 (JP) ........................................ 2001-253796

(51) Int. Cl.[7] .......................... B23K 20/12; B23K 31/02
(52) U.S. Cl. ................................... 228/112.1; 228/2.1
(58) Field of Search .......................... 228/112.1, 114, 228/2.1, 2.3

(56) References Cited

U.S. PATENT DOCUMENTS

| | | | | | |
|---|---|---|---|---|---|
| 5,298,098 | A | * | 3/1994 | Hoedl ........................ | 156/73.1 |
| 5,460,317 | A | * | 10/1995 | Thomas et al. ........... | 228/112.1 |
| 5,603,448 | A | * | 2/1997 | Woerner et al. .......... | 228/114.5 |
| 5,697,511 | A | * | 12/1997 | Bampton .................... | 220/4.12 |
| 5,718,366 | A | * | 2/1998 | Colligan ................... | 228/112.1 |
| 5,813,592 | A | * | 9/1998 | Midling et al. ........... | 228/112.1 |
| 6,008,452 | A | * | 12/1999 | Lux, Jr. ....................... | 174/37 |
| 6,045,028 | A | * | 4/2000 | Martin et al. ............. | 228/112.1 |
| 6,050,474 | A | * | 4/2000 | Aota et al. ................. | 228/112.1 |
| 6,051,325 | A | * | 4/2000 | Talwar et al. ............... | 428/593 |
| 6,168,067 | B1 | * | 1/2001 | Waldron et al. .......... | 228/112.1 |
| 6,237,829 | B1 | * | 5/2001 | Aota et al. .................... | 228/2.1 |
| 6,273,323 | B1 | * | 8/2001 | Ezumi et al. .............. | 228/112.1 |
| 6,302,315 | B1 | * | 10/2001 | Thompson ................. | 228/112.1 |
| 6,305,866 | B1 | * | 10/2001 | Aota et al. ................. | 228/112.1 |
| 6,315,187 | B1 | * | 11/2001 | Satou et al. ............... | 228/112.1 |
| 6,325,274 | B2 | * | 12/2001 | Ezumi et al. .............. | 228/112.1 |
| 6,354,483 | B1 | * | 3/2002 | Ezumi et al. .............. | 228/112.1 |
| 6,378,754 | B2 | * | 4/2002 | Aota et al. ................. | 228/112.1 |
| 6,382,498 | B2 | * | 5/2002 | Aota et al. ................. | 228/112.1 |
| 6,419,144 | B2 | * | 7/2002 | Aota et al. ................. | 228/112.1 |
| 6,474,533 | B1 | * | 11/2002 | Ezumi et al. .............. | 228/112.1 |
| 6,502,739 | B2 | * | 1/2003 | Ezumi et al. .............. | 228/112.1 |

FOREIGN PATENT DOCUMENTS

| | | | |
|---|---|---|---|
| EP | 1 057 576 | | 12/2000 |
| JP | 11-197856 | | 7/1999 |
| JP | 200013576 A | * | 5/2000 |
| JP | 2000135575 A | * | 5/2000 |
| JP | 2000-135577 | | 5/2000 |
| JP | 2000-317654 | | 11/2000 |
| JP | 2001-170782 | | 6/2001 |

OTHER PUBLICATIONS

Partial European Search Report for EP 02 25 0745, completed Dec. 4, 2002.

* cited by examiner

Primary Examiner—Steven Bos
Assistant Examiner—Colleen P. Cooke
(74) Attorney, Agent, or Firm—Antonelli, Terry, Stout & Kraus, LLP

(57) ABSTRACT

A rim member 120 forming an entrance 110 and a plate 11 (21) are friction stir welded by moving a rotary tool 200 along the rim member 120. The rotary tool 120 is tilted along the direction of movement. Welding is started at right block 120R, and when the tool reaches corner portion P5 between the right block 120R and a center block 120C, the tool 200 is pulled out of the rim member 120 and plate 11 (21). Next, the tool is tilted toward the direction of movement along center block 120C. Thereafter, the tool is lowered and inserted to position, and friction stir welding is restarted. According to the invention, the direction of the rotary tool is not changed while the tool is inserted to the rim member 120. This prevents generation of excessive friction heat, and thereby realizes a good weld.

22 Claims, 7 Drawing Sheets

120L: LEFT BLOCK

120C: CENTER BLOCK

200: ROTARY TOOL

FRICTION STIR WELDING METHOD

BACKGROUND OF THE INVENTION

The present invention relates to a friction stir welding method that is particularly preferable for joining aluminum alloy members to form transportation devices such as railway cars, or industrial equipment, science-related equipment, electric appliances, and so on.

Friction stir welding is a method performed by inserting a rotating shaft (called a rotary tool) to the joint portion between members to be welded and moving the rotary tool along the joint line, thereby heating, softening, plasticizing and solid-phase welding the joint portion. The rotary tool comprises a large-diameter portion and a small-diameter portion. During welding, the small-diameter portion is inserted to the member(s) to be welded, and the end surface of the large-diameter portion comes into contact with the member(s). A screw thread is formed to the small-diameter portion. The end surface of the large-diameter portion facing the small-diameter portion is sloped and concaved. The central axis of the rotary tool is tilted along the direction of movement of the rotary tool. That is, the axis of the tool is tilted rearward to the direction of movement thereof.

According to another example, projections protruding to the side from which the rotary tool is inserted are formed to the two members to be welded, and friction stir welding is performed by inserting the small-diameter portion of the rotary tool to the abutted portion and inserting the large-diameter portion of the rotary tool to the projections. The metal material constituting the projections is used as the source material to fill the gap formed between the two abutted members. The projection can be formed only to one of the two members to be welded. Such method is used to weld extruded members, the friction stir welding being performed to the portion where the extruded direction of one member is orthogonal to that of the other member.

Moreover, when performing friction stir welding to form a car body of a railway car and the like having windows provided thereto, a plural number of rotary tools are equipped to one traveling body for the welding process. The traveling body is stopped just before the window portion, and all the rotary tools are retreated from the welded members, before reinserting the rotary tool(s) that does not have the window portion along its path. Then, the movement of the traveling body is restarted, and the friction stir welding is continued.

The above mentioned prior art methods are disclosed in Published Japanese Translation of PCT Patent Application No. 508073/97 (EP 0752926 B1), and Japanese Patent Publication Laid-Open No. 2000-343248 (EP 1057576 A2).

SUMMARY OF THE INVENTION

The side walls of the railway car body are provided with entrances for the crew etc. to get on and off the train. Since a great load is applied to the entrance, a thick rim member is welded onto the panels constituting the side walls of the car body. The rim member comprises of extruded members. The panels and the rim member of the car body are joined by friction stir welding. The rotary tool used for the friction stir welding is moved along the rim member.

In general, the rim member is formed by bending an extruded member into a U-shape. The bent corners are curved in arc-like shapes.

We will now explain how to form the rim member by welding three extruded members, the left block, the right block, and the upper block. The blocks are substantially orthogonal to one another. In the present case, the joint between the left block and the upper block and the joint between the upper block and the right block are substantially right-angled. The entrance through which the crews get on and off the train is generally equipped with such rim member.

When friction stir welding the rim member with the plate of the car body surrounding the rim member, the direction of the rotary tool (that is, the direction of movement of the tool) must be varied by 90 degrees at the joint (right-angled corner). This is because the rotary tool must be tilted along the direction of movement. The direction of the rotary tool is varied either by changing the position of the rotary tool or by changing the position of the members to be welded.

Upon varying the direction of the rotary tool, the movement of the tool must be stopped. Therefore, the movement of the rotary tool is stopped but the rotation of the tool is continued with the tool inserted to the joint of the members being welded. This causes defects to occur at the joint of the friction stir weld.

The same problem occurs even when the angle of the movement of the tool varies more than or less than 90 degrees. The direction of movement of the rotary tool is not just varied when welding a rim member to the entrance opening of the car body, but also when forming various members used in the field of construction, in the field of industrial appliances, or in other fields.

An optical sensor is used to detect the abutted portion for inserting the rotary tool thereto and guiding the movement of the tool, but when the direction of movement (the direction of the joint line) varies greatly (i.e., 90 degrees), the optical sensor fails to detect the abutted portion when it approaches the corner area.

Moreover, since the car body and the rim member of the entrance is formed of extruded members, and since the direction of extrusion is orthogonal to one another, the projection serving as the source material for filling the gap existing at the abutted portion can only be provided to one of the members to be welded. Therefore, defect is likely to occur to the joint.

The first object of the present invention is to provide a friction stir welding method capable of providing a good weld even when the angle of the joint line varies greatly.

The second object of the present invention is to provide a friction stir welding method capable of providing a good weld when bonding the abutted portion between extruded members.

The first object of the present invention is achieved by retreating the rotary tool from the members being welded when the tool moving along the joint line reaches the position in which the direction of the joint line changes, changing the direction of the rotary tool or the welded members, reinserting the rotary tool to the welded members, and moving the rotary tool along the new joint line.

Further, the object of the invention is achieved by abutting the end portion of a first member against the end portion of a second member, the abutted line or joint line varying greatly, wherein the relative movement of the rotary tool against the joint line is controlled based on a data stored in advance.

The second object of the present invention is achieved by abutting the end portion of a first member against the end portion of a second member having a projection formed thereto, performing fillet welding to the end portion of said second member along the projection, and performing friction stir welding by inserting a rotary tool to the abutted portion.

DETAILED DESCRIPTION OF PREFERRED EMBODIMENTS

Figure 1:
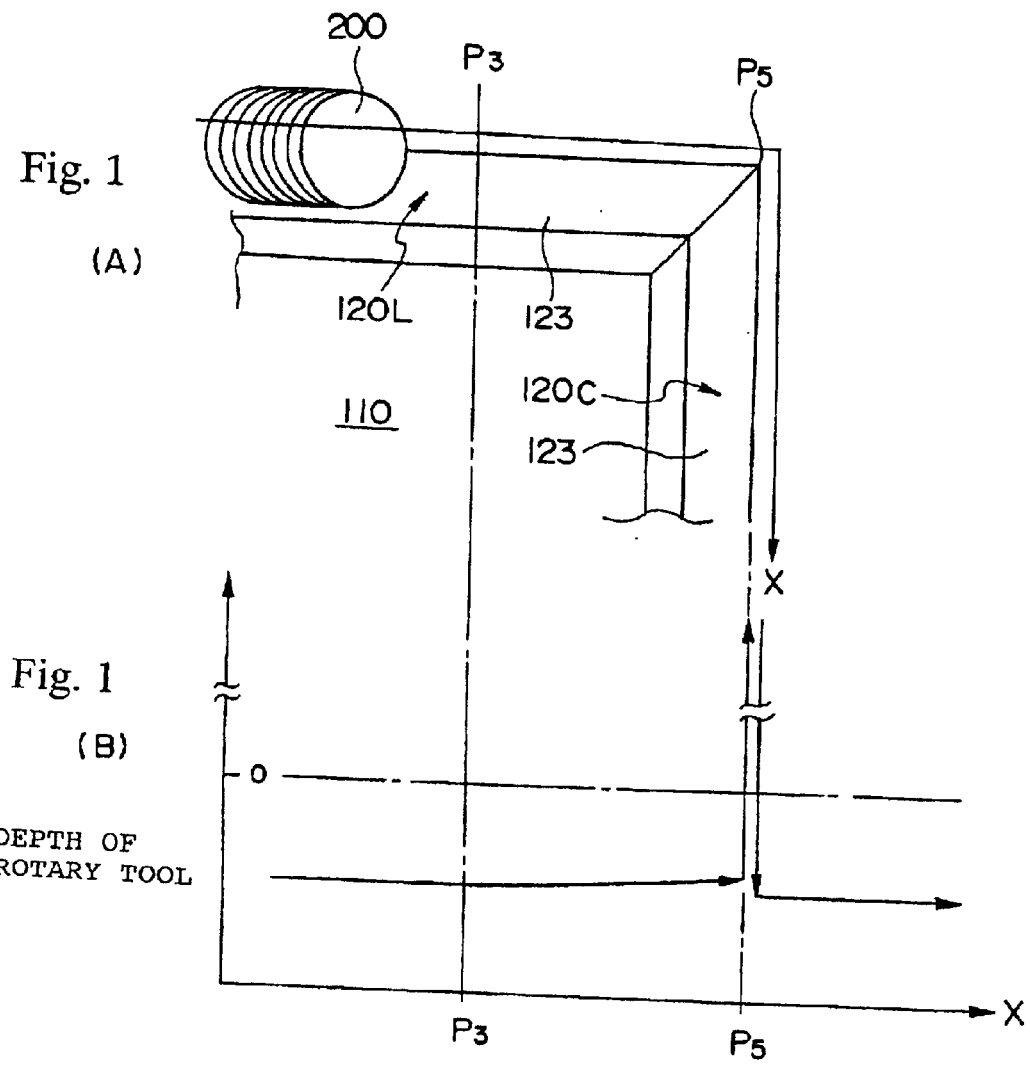
FIG. 1 is an explanatory view showing the operation of one embodiment of the present invention.

The preferred embodiment of the present invention will now be explained with reference to FIGS. 1 through 7. In FIG. 1 (A), the angle of the joint line of the members to be welded is varied orthogonally. In FIG. 1(B), the orthogonal joint line is extended linearly for explanation.

A car body 100 of a railway car comprises side structures 101 that constitute the side walls of the car, a roof structure 102 that constitutes the roof thereof, an underframe 103 that constitutes the floor thereof, and end structures 104 that constitute the longitudinal ends thereof. The side structures 101, the roof structure 102, and the underframe 104 are each formed by welding together plural extruded members 10, 20. The longitudinal direction (extruded direction) of each extruded member 10, 20 is arranged along the longitudinal direction of the car body 100. Each extruded member 10, 20 are a hollow member made of aluminum alloy.

Each side structure 101 has plural windows 130, and entrances 110, 140 through which people enter and exit the railway car. The entrance 110 is mainly for the crew such as the train operator, and the width thereof is relatively small. The entrance 140 is mainly for passengers, and the width thereof is relatively large. The rim of the opening of the entrances 110 and 140 are provided with rim members 120, 141, respectively, which are welded thereto.

The direction of extrusion of the extruded members 10, 20 constituting the side structure 101 is the longitudinal direction of the car body or longitudinal direction of the side structure 101. Since the rim member 120 (141) is also extruded, the direction of extrusion of the left and right blocks of the rim member 120 (141) are orthogonal to the direction of extrusion of the members 10 and 20. The extruded members 10 and 20 are hollow members.

Each hollow member 10 (20) consists of two substantially parallel face plates 11 (21) and 12 (22), and plural connecting plates 13 (23) and 14 (24) that connect the two face plates.

The connecting plate 14 (24) positioned at the width-direction-end of the hollow member 10 (20) is orthogonal to the face plates 11 and 12 (21 and 22). At the outer surface of the connection between the connecting plate 14 and the face plate 11 (12) is formed a recessed portion on which the face plate 21 (22) of the hollow member 20 overlaps. At the end of the face plates 11 and 12 there are protruded blocks 15 that support the face plates 21 and 22. The protruded blocks 15 extend from the connecting plate 14. The protruded blocks 15 are connected to the recessed portions. The ends of the face plates 21 and 22 of the hollow member 20 are superposed on the recessed portions and the protruded blocks 15 of the hollow member 10.

At the end of each face plate 11 and 12 (21 and 22) there is formed a projection 17 (27) that protrudes toward the outer side (the outer direction of thickness) of the hollow members 10 and 20. The end surface of the face plates 11, 21 and the projection 17 (in other words, the edge of the recessed portion close to the face plates 11 and 12) is near the center of thickness of the connecting plate 14. The end surface of the face plate 11 (12) and projection 17 of the hollow member 10 is abutted against the end surface of the face plate 21 (22) and projection 27 of the hollow member 20.

The outer surface of the face plate 11 (12) is leveled with the outer surface of the face plate 21 (22), and the protruding height of the projections 17 and 27 are the same. The width of the two projections 17 and 27 are the same. The width of the two projections is greater than the diameter of the large-diameter portion 201 of the rotary tool 200.

Figure 5:
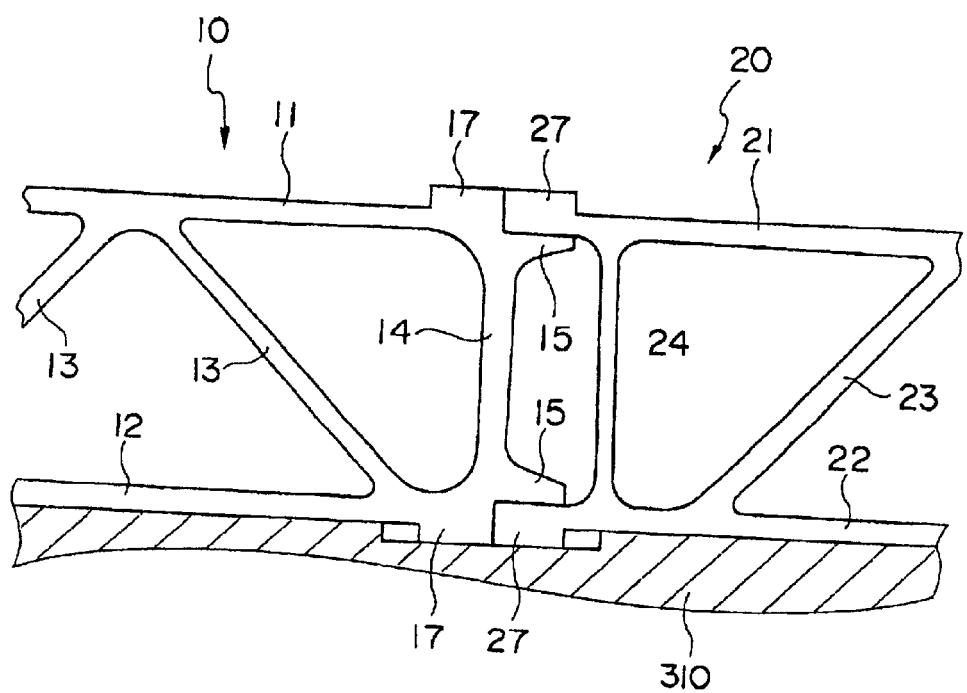
FIG. 5 is a vertical cross-sectional view taken at line V—V of FIG. 3.

First, the member 10 and the member 20 are welded together. As is shown in FIG. 5, the two hollow members 10 and 20 are mounted on a base 310 and fixed thereto before the weld. A rotary tool 200 comprises a small-diameter portion 220 formed at the tip of a large-diameter portion 210. The small-diameter portion 220 is provided with a screw thread. The end surface of the large-diameter portion 210 facing the small-diameter portion 220 is coned, with the axial center side thereof being concaved.

Upon welding the members, the rotary tool 200 is inserted to the abutted portion. The lower end of the large-diameter portion 210 is inserted to the projections 17 and 27 which are positioned above the face plates 11 and 21. The small-diameter portion 220 is inserted to the abutted portion between the face plates 11 and 21. The lower end of the small-diameter portion 220 is somewhat inserted in the protruded block 15. The rotary tool 200 is rotated and moved along the joint line of the abutted portion. The central axis of the rotary tool 200 is tilted along the direction of movement. The small-diameter portion 220 precedes the large-diameter portion 210. The metal constituting the projections 17 and 27 is utilized as the source material for filling the gap formed at the a butted portion. There is no gap shown in the abutted portion of FIG. 5.

After completing the friction stir welding of the upper surface of FIG. 5, the upper and lower sides of the hollow members 10 and 20 are reversed, and friction stir welding of the opposite side is performed in a similar manner.

After welding all the hollow members 10, 20 that constitute the side structure 101, the unnecessary areas around the windows 130 and entrances 110 and 140 are cut off, with the inner side of the car body facing upward. According to this cutting process, the end region around the windows 130 or the opening of the entrances 10 and 140 of the faceplate 21 (11) facing the exterior of the car body is protruded toward the opening side than the end portion of the face plate 22 (12) facing the interior of the car body or the end portion of the connecting plates 23, 24 (13, 14).

Figure 3:
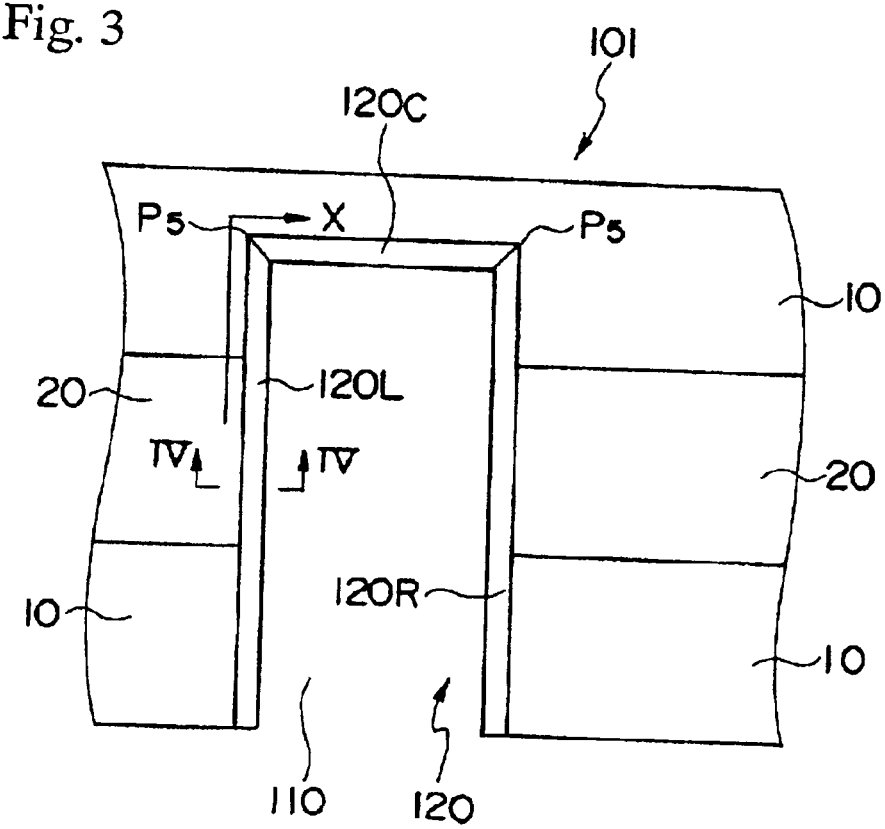
FIG. 3 is a front view showing the entrance formed to the side structure of one embodiment of the present invention.

Next, rim members 120 and 141 are friction stir welded onto the side structure 110 formed as mentioned above. In FIG. 3, the rim member 120 is formed by welding together three linear extruded members 120L, 120C, and 120R to create a U-shaped structure. The joint line between the blocks 120L and 120R and the plate 11 (21) is orthogonal to the joint line between the center block 120C and the plate 11 (21).

The rim member 120 comprises a block 121 that terminates the ends of the hollow members 10 and 20, a projection 123 that protrudes outward from the outer surface of the face plate 21 (11) facing the exterior of the car body, a protruded block 125 that overlaps the inner surface of the face plate 21 (11), and a protruded block 127 that overlaps the outer surface 22 (12) of the face plate facing the interior of the car body. The exterior end surface of the block 121 excluding the projection 123 is positioned substantially on the same plane as the outer surface of the face plate 21 (11). The protruded block 125 on the exterior side is recessed from the exterior of the car body. The end of the face plate 21 (11) is abutted against the rim member 120. The protruded block 127 facing the interior of the car body overlaps the outer side of the face plate 22 (12) facing the interior of the car body, and fillet welding is performed thereto. The fillet welding is performed at an appropriate timing either before or after the friction stir welding.

Since the end of the face plates 21 and 11 abutted against the rim member 120 is at the end of the direction of extrusion, there are no projections 17 and 27 formed to the face plates 11 and 21. Since the hollow member 10 coming into contact with the center block 120C of the U-shaped rim member 120 has its width-direction-end cut off, there are no projections 17 and 27 on the hollow member 10.

Figure 4:
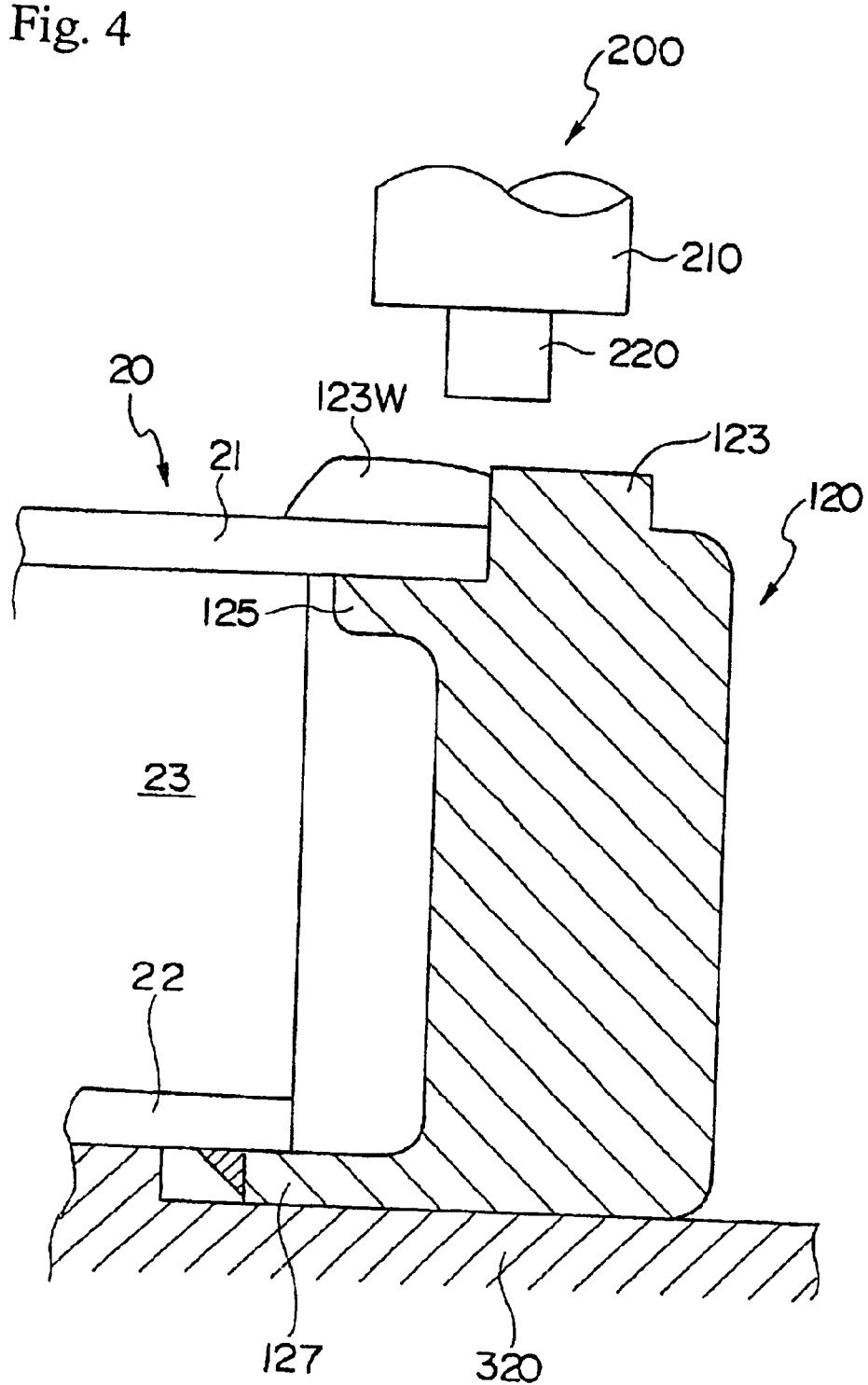
FIG. 4 is a cross-sectional view taken at IV—IV of FIG. 3.
Figure 6:
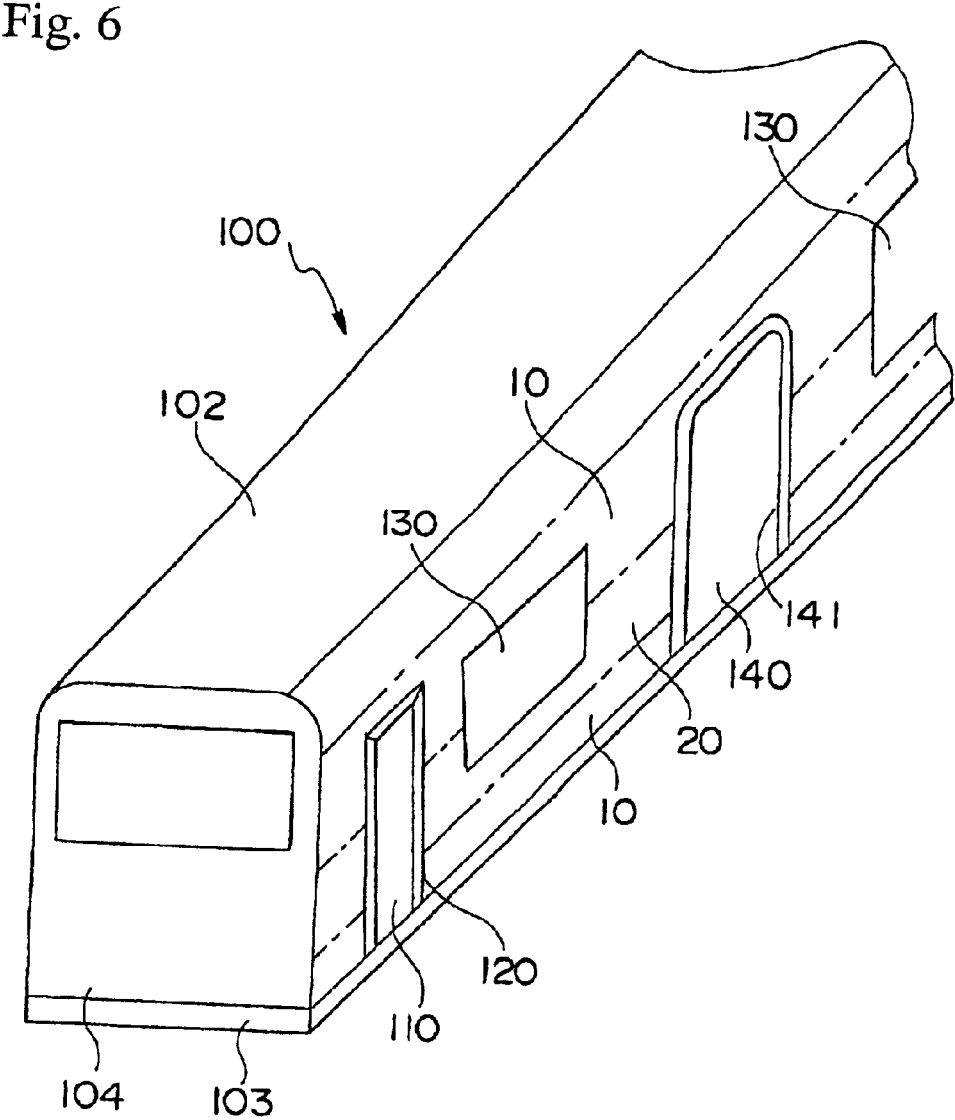
FIG. 6 is a perspective view showing the car body of the railway car.

FIG. 4 shows the state just before performing the friction stir welding to the members, but shows no gap at the abutted portion. The rim member 120 and the side structure 110 are fixed on the base 320. In FIG. 6, hollow members 10 and 20 are positioned between the rim member 120 and the end structure 104, but these can be replaced with a simple plate.

The abutted portion between the face plate 21 (11) and the rim member 120 is friction stir welded from above. The small-diameter portion 220 of the rotary tool 200 is inserted to the abutted portion. The tip of the small-diameter portion 220 is somewhat inserted to the protruded block 125. A part of the large-diameter portion 210 is inserted to the projection 123. The large-diameter portion is inserted so that a gap is exists between the lower end of the large-diameter portion 210 and the upper surface of the face plate 21 (11). Since the rotary tool 200 is inserted with the large-diameter portion 210 tilted rearward along the direction of movement, the gap is formed between the lowermost end of the tilted large-diameter portion 210 and the upper surface of the face plate 21 (11).

At the abutted portion of the rim member 120, a projection 123 that provides the source material to fill the gap existing at the abutted portion is formed to the rim member 120, but there are no projections 17 or 27 on the hollow members 10 and 20. Therefore, only one of the abutted members have the projection. Friction stir welding is possible at such state, but it is preferable that both abutted members are provided with such projections. Therefore, after positioning the rim member 120 to the side structure 101, fillet welding is performed to the face plates 11 and 21 of the hollow members 10 and 20 along the rim member 120. The height and width of the fillet weld should preferably correspond to that of the projection 123, but even if it is smaller than the projection 123, the fillet weld is still effective. Upon friction stir welding, the end portion of the large-diameter portion 210 of the rotary tool 200 should be inserted to the metal material constituting the fillet weld, as is in the case with the projection 123. The fillet weld 123W is shown only in FIG. 4.

The fillet weld should be adhered to the face plates 11 and 21 by a strength strong enough to keep the weld from scattering when performing the friction stir weld. There is no need to weld the face plates 11 and 21 to the rim member 120 firmly. It is preferable that the face plates 11 and 21 contact the protruded block 125 upon welding, but this is not necessary when fillet welding is performed. When no fillet welding is formed, a gap exists between the large-diameter portion 210 of the rotary tool 200 and the face plate 21 (11), and the face plate 21 (11) may not come into contact with the protruded block 125, causing weld defect. However, if fillet weld is provided to the joint, the metal of the weld exists between the large-diameter portion 210 and the face plate 21 (11), thereby effectively pressing the face plate 21 (11) to the protruded block 125. A good weld is thereby realized. Moreover, the fillet weld can be performed easily.

When fillet weld is provided to the joint, the detection of the abutted portion using the optical sensor becomes difficult. Moreover, when the direction of the joint line changes greatly, for example when the joint line is curved having a small radius of curvature or when the joint line is bent orthogonally, it becomes difficult to detect the joint line using the optical sensor. In such cases, it is preferable to perform a numerical control to guide the rotary tool.

In FIG. 3, the rotary tool 200 is inserted to the abutted portion on the lower end of the left block 120L of the rim member 120, and friction stir welding is started therefrom. The rotary tool 200 moves through the left block 120L, the center block 120C, the right block 120R, and terminates weld at the lower end of the right block 120R.

After inserting the rotary tool 200 to the area to be welded, the rotary tool 200 is rotated and moved along the joint line. The direction of movement is shown by arrow X. The central axis of the rotary tool 200 is at the middle of the abutted portion between the rim member 120 and the face plate 21 (11).

Figure 7:
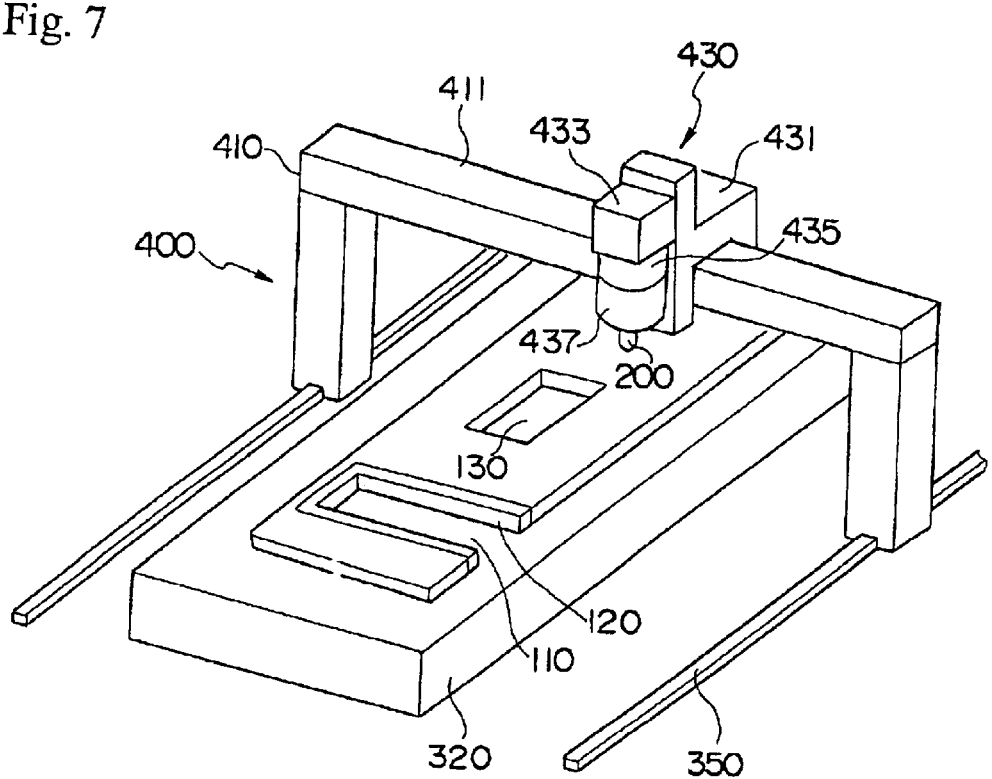
FIG. 7 is a perspective view of the friction stir welding device.

In FIG. 7, the side structure 101 is mounted on a base 320. A traveling body 410 of a friction stir welding device 400 moves above the base 320. The traveling body 410 is driven along the rails 350 provided to both sides of the base 320. The friction stir welding device 430 is mounted to a girder of the traveling body 410. The device 430 comprises a traveling body 431 that runs along the girder 411, an elevating body 433 that moves vertically against the traveling body 431, a rotary device 435 that rotates against the elevating body 433, and a rotary device 437 that is tilted against the rotary device 435 and that rotates the rotary tool 200. By the movement of the traveling body 410 and the traveling body 431, the rotary tool 200 can move in X and Y directions. The rotary device 435 enables to change the tilting direction of the rotary tool 200 along the joint line. The elevating body 433 moves the rotary tool 200 in the vertical direction. The position (height etc.) of the traveling bodies 420 and 431, the rotary device 435, and the rotary tool 200 is controlled numerically.

Figure 2:
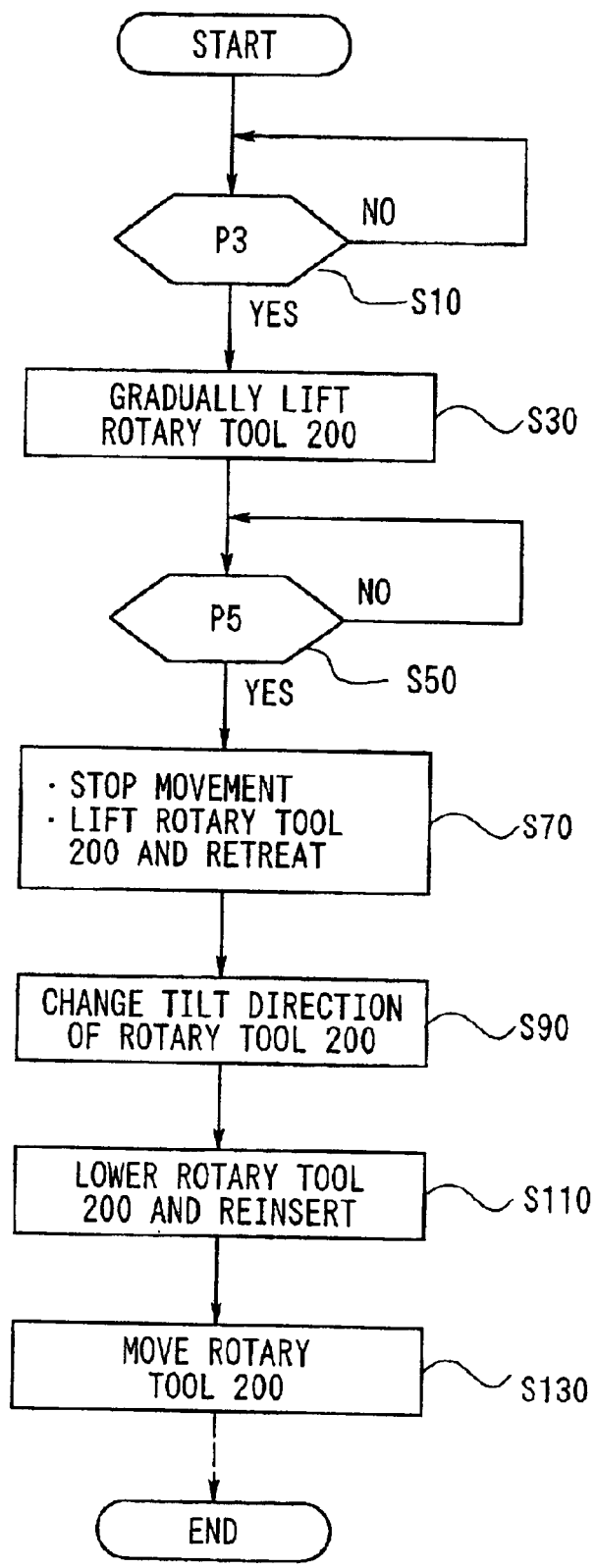
FIG. 2 is a flowchart showing one embodiment of the present invention.

According to FIGS. 1 and 2, the rotary tool 200 is rotated and inserted to the predetermined position of the members 10 and 120L to be welded together, and the tool is moved in direction X, thereby starting the friction stir welding. When the tool 200 moves along the left block 120L and reaches a predetermined position P3 (predetermined distance from the corner portion) just before the corner between the center block 120C, the tool 200 starts to elevate. The elevation speed is slow. The movement of the rotary tool 200 is continued. Therefore, the insertion depth of the rotary tool 200 gradually becomes shallower. The predetermined distance is set for example to 50 mm. The elevation distance of the rotary tool during that predetermined distance is set for example to 0.5 mm. The predetermined position is calculated from the distance of travel of the traveling body 320. The height (position) "0" of the rotary tool according to FIG. 1 refers to the height (position) of the upper surface of the member 120 to be welded (steps S10, S30).

Upon starting the friction stir welding, the tip of the rotary tool 200 not being rotated is introduced to the predetermined position on the side structure 101, thereby teaching the starting point to the control unit. The starting point is set for example to the center of length of the center block 120C, and is provided at the upper edge thereof. The starting point is marked in advance. According to another example, the starting point is marked at the upper edge of the center of width of the opening of entrance 120. The size etc. of the rim member 120 is input to the control unit. Whe the friction stir welding is started, the control unit drives the traveling bodies 420 and 431, the rotary device 435, and the rotary tool 200 based on numerical control.

Then, when the rotary tool 200 reaches a corner portion P5 between the left block 120R and the center block 120C, the movement of the rotary tool is stopped while the rotation is still continued, and the rotary tool 200 is moved upward, and the tool is retreated (pulled out) from the members being welded. The rotary tool 200 is pulled out in a tilted state. When the rotary tool 200 is pulled out, a hole having substantially the same size as the small-diameter portion 220 of the tool is formed (steps S50, S70).

Next, the rotary device 435 is driven to rotate the rotary tool 200 horizontally, thereby tilting the rotary tool 200 against the joint line existing ahead (joint line along center block 120C). In other words, the direction of tilt of the rotary tool 200 is changed by 90 degrees from the original direction of tilt. The rotary tool 200 is tilted setting the lower end of the small-diameter portion 220 as the center of tilt. Therefore, the position of the lower end of the small-diameter portion 220 of the rotary tool 200 after changing the direction of tilt is substantially equal to the position of the lower end of the small-diameter portion 220 when the tool was retreated (pulled out) from the welded members.

Next, the rotary tool 200 is lowered while being rotated, and inserted to the predetermined position. When the rotary tool is lowered, the small-diameter portion 220 enters the hole that was created when the tool was pulled out of the members. Therefore, the hole created by the removal of the tool is friction stir welded, and the hole disappears. The insertion depth of the rotary tool 200 is deeper than the depth of the rotary tool before it had been pulled out. That is, the insertion depth of the rotary tool 200 is the same as the insertion depth at position P3, before starting the ascent of the tool. In FIG. 1, the position where the rotary tool 200 is ascended and the position where it is descended is varied, but it is varied only for explanatory means (step S10).

After inserting the rotary tool 200 to the predetermined depth, the rotary tool 200 is moved along the center block 120C (step S130).

The same operation is performed at position P3 in front of the corner P5 between the center block 120C and the right block 120R, and at the corner P5 thereof. When the tool reaches the lower end of the right block 120R, the rotary tool 200 is pulled out, and friction stir welding is ended. The hole formed at the end of the joint line is filled by welding and the like. The joint not being welded from the end of the friction stir weld to the end of the member is welded using a normal welding means. Further, the joint not being welded at the left block 120L before the starting point of the friction stir weld is welded using a normal welding means.

According to the present invention, since the rotary tool 200 is pulled out of the members being welded at the corner portion P5 to change the direction of tilt of the tool, the temperature of the members being welded will not increase excessively even if some time is spent when changing the direction of the tool. Therefore, a good friction stir weld is realized. If the tool is still inserted to the welded members when changing the direction thereof, the rotation of the rotary tool 200 produces excessive friction heat, causing defect to the weld.

At position P3, the insertion depth of the rotary tool 200 starts to be reduced gradually while the tool moves toward the corner, and at the corner position P5 the movement of the tool is stopped and the tool is pulled out from the members upon reinsertion, the tool is inserted deeper than the depth in which the tool stopped moving (before retreating the tool), and the movement is started (friction stir welding is started).

If the insertion depth before retreating the tool and the reinsertion depth are the same, defect may occur to the friction stir weld. Defect tends to occur near the tip of the small-diameter portion 220 of the rotary tool 200. However, as mentioned above, if the friction stir welding is restarted with the tool being inserted deeper than when it was pulled out, the occurrence of a defect can be prevented effectively.

According to the above-mentioned embodiment, the depth of the tool is gradually reduced before the tool is pulled out, and the tool is reinserted to a depth deeper than where it was pulled out, but the following suggests another example. The welding is performed at a fixed depth until the tool reaches corner portion P5, and the reinsertion of the tool is performed to a depth somewhat deeper than the fixed depth (for example, 0.5 mm), and after restarting movement of the tool, the depth of the tool is gradually reduced until it reaches the fixed insertion depth (the depth at corner portion P5), and the insertion depth of the tool is fixed thereafter. For example, after moving for 50 mm, the tool reaches the fixed insertion depth.

The welding of the rim member 141 and the side structure 101 is performed as mentioned above. Fillet welding is also performed as above. However, since the corner of the rim member 141 is curved, the rotary tool 200 is not retreated, but instead, the rotary tool is moved along the curved arc-shaped joint line, thereby continuously performing the friction stir welding. Lastly, the projection 123 formed to the exterior side of the car body or the projection of the fillet weld 123W are cut off using a grinder and the like, creating a coplanar surface as the outer surface of the face plates 11 and 21.

In the above-mentioned embodiment, the direction of movement of the rotary tool is changed by 90 degrees, but even when the angle is greater than or smaller than 90 degrees, the rotary tool can still be retreated from the welded members to change the direction of tilt of the tool in order to realize a good friction stir weld. The present invention can be applied to welding a joint line that changes directions greatly and linearly.

In the above embodiment, the rotary tool 200 is rotated to change the direction of the tool, but instead, the members being welded can be rotated after retreating the tool in order to change the relative direction of the rotary tool. Such movement of the welded members corresponds to changing the direction of movement of the rotary tool 200.

The technical scope of the present invention is not restricted by the terms used in the claims or in the summary of the present invention, but is extended to the range in which a person skilled in the art could easily substitute based on the present disclosure.

According to the present invention, even in the case where the angle of the joint line is changed greatly, a satisfactory friction stir weld is performed.

Further, even when the projection providing source material to fill the gap formed at the joint region is only provided to one of the members to be welded, fillet welding is performed to the joint region so as to realize a satisfactory friction stir weld.

What is claimed is:

1. A friction stir welding method comprising:
    conducting friction stir welding of at least first and second members, the at least first and second members forming a joint line, the friction stir welding being performed using a rotary tool along the joint line;
    retreating said rotary tool from said at least first and second members being welded, when said rotary tool, moving along the joint line, reaches a position where the direction of the joint line changes, so that the rotary tool is withdrawn from the joint line;

changing the direction of said rotary tool or said members being welded;

reinserting said rotary tool to said members being welded substantially at the position where said rotary tool was retreated; and moving said rotary tool along the joint line in the changed direction of the joint line.

2. A friction stir welding method according to claim 1, wherein said direction of said rotary tool is changed by retreating the insertion tool and then rotating a device that supports said rotary tool, thereby varying the tilt angle of said rotary tool against the direction of movement thereof.

3. A friction stir welding method according to claim 1, wherein the tilt angle of said rotary tool is varied with said retreating position set as reference.

4. A friction stir welding method according to claim 1, wherein the tilt angle of said rotary tool is varied with the tip of said rotary tool set as reference.

5. A friction stir welding method according to claim 1, wherein the insertion depth of said rotary tool at the time of reinsertion is deeper than the insertion depth of said rotary tool before being retreated from said retreating position.

6. A friction stir welding method according to claim 5, further comprising:

gradually reducing the insertion depth of said rotary tool before retreating the same; and upon reinsertion, inserting the rotary tool to a depth equal to the insertion depth of said tool before the gradual reduction of depth.

7. A friction stir welding method according to claim 5, further comprising:

upon reinsertion, inserting the rotary tool to a depth deeper than the insertion depth of said rotary tool before being retreated; and after reinsertion, gradually reducing the insertion depth after starting the movement of said rotary tool.

8. A friction stir welding method according to claim 1, wherein retreating of said rotary tool is performed after stopping the movement of said rotary tool.

9. A friction stir welding method comprising:

abutting an end portion of a first member against an end portion of a second member;

said abutted line or joint line being varied greatly; and relatively moving a rotary tool against said joint line based on a data stored in advance.

10. A friction stir welding method according to claim 9, comprising:

setting said rotary tool to a predetermined position on said first member or said second member;

storing said position into a memory as the starting point; and relatively moving said rotary tool to said predetermined position on the abutted portion based on the data stored in advance.

11. A friction stir welding method according to claim 1, wherein the direction of the joint line changes from a first direction to a second direction, the second direction being orthogonal to the first direction.

12. A friction stir welding method according to claim 11, wherein the first and second directions are straight lines.

13. A friction stir welding method according to claim 1, wherein the direction of the joint line changes from a first direction to a second direction, at least one of the first and second directions being a straight line.

14. A friction stir welding method according to claim 1, wherein one of the at least first and second members has a projection along the joint line, extending toward the rotary tool, and another of the at least first and second members, adjacent the joint line and forming the joint line with said one of the at least first and second members, does not have a projection; and wherein a fillet weld is provided on said another of the at least first and second members, at the joint line between said one and said another of said at least first and second members.

15. A friction stir welding method according to claim 14, wherein said fillet weld has a height and width substantially the same as a height and width of said projection.

16. A friction stir welding method according to claim 8, wherein rotation of the rotary tool is continued during said retreating, while movement of the rotary tool along the joint line is stopped during said retreating.

17. A friction stir welding method according to claim 16, wherein the rotary tool is tilted during said retreating.

18. A friction stir welding method according to claim 1, wherein the rotary tool is rotated during said reinserting at the position where the rotary tool was retreated.

19. A friction stir welding method according to claim 1, wherein during said retreating a hole is left at the position where the rotary tool was retreated, and wherein in said reinserting the rotary tool is inserted into said hole.

20. A friction stir welding method according to claim 1, wherein said conducting friction stir welding is performed prior to said retreating, and is performed to said position where the direction of the joint line changes.

21. A friction stir welding method according to claim 1, wherein the joint line extends continuously through the position where the direction of the joint line changes.

22. A friction stir welding method comprising:

retreating a rotary tool from members being welded when said rotary tool moving along a joint line reaches a position where the direction of the joint line changes;

changing the direction of said rotary tool or said members being welded, wherein said direction is changed by retreating said tool and then rotating said members being welded, thereby varying the tilt angle of said rotary tool against the direction of movement thereof;

reinserting said rotary tool to said members being welded substantially at the position where said tool was retreated; and moving said rotary toot along a new joint line.

* * * * *